United States Patent [19]

Hahn

[11] Patent Number: 4,696,613
[45] Date of Patent: Sep. 29, 1987

[54] ARRANGEMENT FOR VERTICALLY POSITIONING PLATE-SHAPED BODIES

[75] Inventor: Thomas O. Hahn, Frankfurt am Main, Fed. Rep. of Germany

[73] Assignee: Glasbau Hahn GmbH & Co.Kg., Frankfurt am Main, Fed. Rep. of Germany

[21] Appl. No.: 776,572

[22] Filed: Sep. 16, 1985

[30] Foreign Application Priority Data

Sep. 25, 1984 [DE] Fed. Rep. of Germany ....... 3435144

[51] Int. Cl.[4] ............ E04G 21/14; B66C 1/02
[52] U.S. Cl. .................... 414/11; 414/719; 414/737; 414/744 B; 294/65; 212/196; 212/188
[58] Field of Search ............ 414/10, 11, 736, 719, 414/737, 744 B; 212/231, 168, 188, 255, 266, 195, 196; 294/65

[56] References Cited

U.S. PATENT DOCUMENTS

| | | | |
|---|---|---|---|
| 1,296,079 | 3/1919 | Hitchcock et al. | 294/65 |
| 1,426,692 | 8/1922 | Waldron | 294/65 |
| 1,505,626 | 8/1924 | Debaeker | 294/65 |
| 1,519,243 | 12/1924 | Ericsson | 294/65 |
| 1,792,576 | 2/1931 | Dryon | 294/65 |
| 1,872,413 | 8/1932 | Crowley | 294/65 |
| 2,172,199 | 9/1939 | Haworth et al. | 294/65 |
| 2,956,691 | 10/1960 | Fangman | 212/231 X |
| 3,765,544 | 10/1973 | Murphy | 212/231 X |
| 3,909,056 | 9/1975 | Duwe | 414/11 X |
| 4,141,455 | 2/1979 | Henderson et al. | 212/188 |

FOREIGN PATENT DOCUMENTS

| | | |
|---|---|---|
| 0413160 | 10/1923 | Fed. Rep. of Germany . |
| 853425 | 7/1949 | Fed. Rep. of Germany ........ 414/10 |
| 1973589 | 11/1967 | Fed. Rep. of Germany . |

OTHER PUBLICATIONS

"Verglasungs-Gehange", Pannkoke, Flachglastechnik GmbH, Lubeck, W. Germany, 8-1982.

*Primary Examiner*—Robert J. Spar
*Assistant Examiner*—Jay I. Alexander
*Attorney, Agent, or Firm*—Bucknam and Archer

[57] ABSTRACT

A positioning arrangement for use with a device having a fixed or movable crane arm includes a suction device for plate-shaped bodies which hangs from the free end of the crane arm, the suction device being provided with a tilting device. The tilting device is infinitely variable by a setting mechanism. In this way, the center of gravity of the suction device with the plate-shaped body attached by suction may be adjusted such that the plate-shaped body is kept vertically.

5 Claims, 2 Drawing Figures

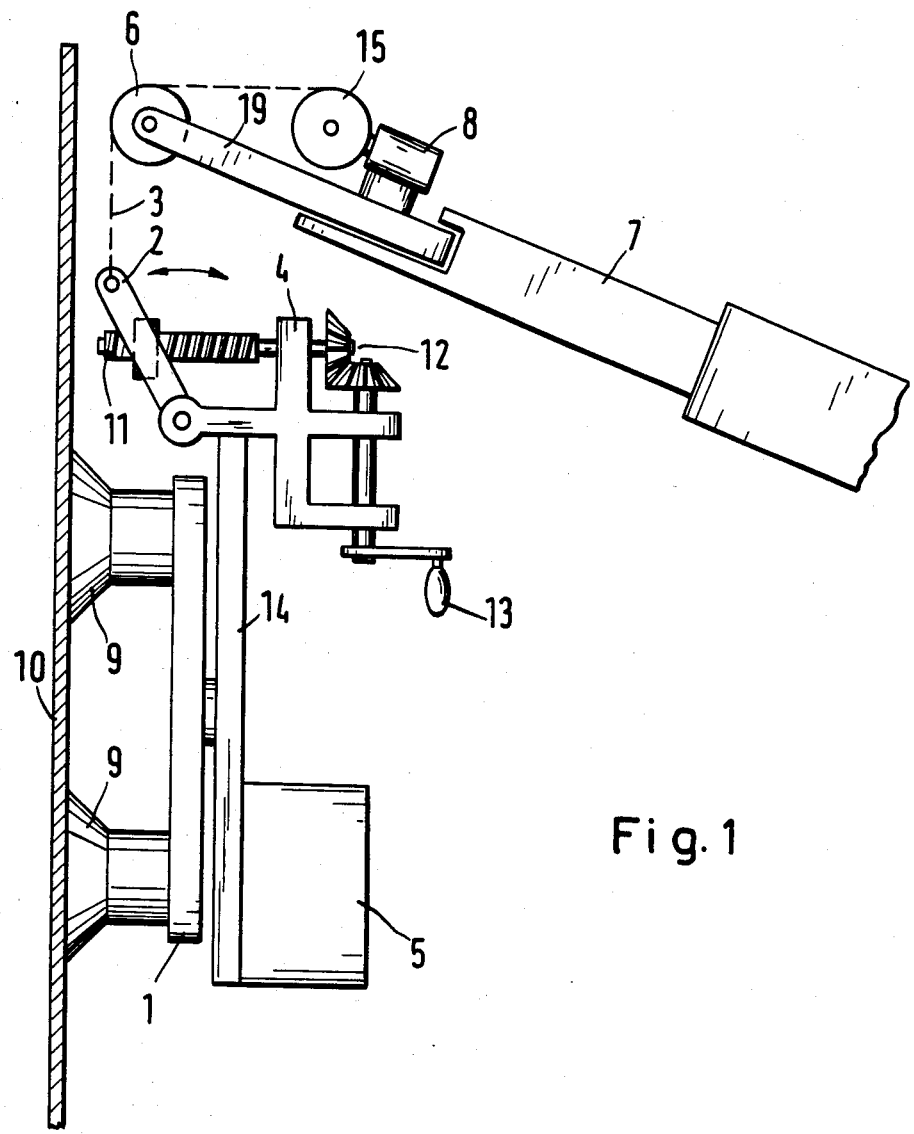
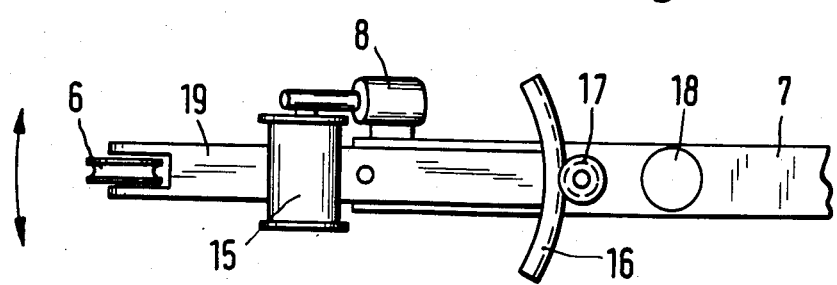

ARRANGEMENT FOR VERTICALLY POSITIONING PLATE-SHAPED BODIES

BACKGROUND OF THE INVENTION

The invention relates to a positioning arrangement for use with a device with a fixed or movable crane arm, wherein a tensile stressed means hangs from the free end of the crane arm for the vertical hoisting and lowering of a suction device for holding plate-shaped bodies in a defined position, the suction device being suspended at a point of attachment and a tilting device being attached to the suction device.

Such devices are, for example, used at the processing and treatment of glass panes, and especially during the installation of glass panes at construction sites. In this connection, the suction device is used for holding the glass pane, which can then be transported by means of a lifting apparatus, for example, a crane to the desired place.

As a rule, the suction device provides several suction heads, which are arranged side by side in a row on a traverse. The device for vertical hoisting and lowering of the suction device is attached to the traverse. Since the installation of the glass panes is performed in most cases in the vertical position, the suction device is centrally applied in the upper half at the glass pane. With this kind of holding, the glass pane never reaches a vertical or nearly vertical position because of the unfavourable position of the center of gravity. Difficulties occur, especially during the installation of very large glass panes, when the glass pane which is not vertically arranged while being transported by the crane is to be brought into a vertical mounting position.

A device of the above-identified type is already known (DE-GBM No. 1 973 589) wherein the tilting device attached to the suction device provides curved paths, on which pulleys slide which are provided at the end of the tensile stressed device. The suction device with the attached plate-shaped body can be pivoted between two end positions due to the shape of the curved paths, the plate-shaped body either being in an almost vertical position or in a horizontal position. A completely vertical position cannot be achieved, since, in both end positions, the center of gravity of the formation consisting of the suction device and the plate-shaped body is not below the tensile stressed device.

On the other hand, the suction device with the attached plate-shaped body is mounted in a stable manner only in the two end positions. In all interim positions, the suction device with the attached plate-shaped body does not remain stable.

Moreover, a device is known (DE-PS No. 413 160) which enables a plate-shaped body to be brought from a tilted position to an almost vertical position; however, a vertical position of the plate-shaped body can never be achieved by means of this device, since the point of attachment of the cable rope holding the suction device lies vertically above the center of gravity of the suction device itself but not above the formation consisting of the suction device and the plate-shaped body attached thereto.

Because of the existence of another known device, the variation of the position of a glass pane hanging on a suction device by varying the point of attachment at the suction device is already state of the art. In the paper "VerglasungsGehänge (8/82)" of the company Pannkoke, Flachglastechnik GmbH, Hendelweg 5, 2400 Lübeck 1, Western Germany, a suction device is described which serves for the hoisting and lowering of glass panes within an angle of 90 degrees. There, the point of attachment at the suction device can be pneumatically moved in the lifting apparatus parallel to the suction plane. However, with this known device, the glass pane may not be brought in a vertical position.

An important object of the invention is to provide a device of the above-mentioned type, by means of which a plate-shaped body may be held in a vertical position even if the free end of the crane arm is below the upper edge of the plate-shaped body.

SUMMARY OF THE INVENTION

This problem is solved in that a tilting device is provided which is infinitely variable by means of a setting mechanism.

Thus, the setting mechanism also renders possible the variation of the point of attachment and, hence, the position of the plate-shaped body with regard to the vertical. Depending on the size of the glass pane and on the attachment of the suction device which is constructed to apply suction to the glass pane at a suction plane, the plate-shaped body can be brought in a vertical position by means of the setting mechanism.

The device preferably is constructed such that the point of attachment of the suction device is movable relative to the suction plane. Another advantage of the invention is that a counterweight, which may be constituted by suction-generation means, is attached to the suction device on the side opposite the suction plane. In this connection, the counterweight serves additionally for the variation of the position of the center of gravity.

A further development of the invention is achieved in that the hoisting and lowering device, for example, the cable pulley, forms, together with the cable rope, the free end part of the crane arm. Such a construction of the crane arm enables the lifting of the plate-shaped body by means of the lifting mechanism so far that the top edge of the plate-shaped body projects above the crane arm. Due to this fact, it is possible to transport the plate-shaped body, especially a glass pane, even beneath projections and through openings.

BRIEF DESCRIPTION OF THE DRAWING

The invention is explained in more detail by means of an example as illustrated in the drawing:

FIG. 1 is a side elevational view of the crane arm and the suction device, and

FIG. 2 is a top plan view of the crane arm.

DESCRIPTION OF THE PREFERRED EMBODIMENT

At the end of the crane arm 7 a cable pulley 6 is attached, over which the cable rope 3 runs. The cable rope 3 can be hoisted and lowered by a cable winch 15 driven by an electric motor 8. The cable rope 3 is connected to the point of attachment 2 of the tilting device 4. A mounting support 14 is mounted on the tilting device 4 and supports suction heads 9 which have open ends that open onto a suction plane. By means of the tilting device 4, the point of attachment 2 of the cable rope 3 can be moved in a direction substantially perpendicular to the glass pane 10. The movement can be performed mechanically, electrically, hydraulically, pneumatically, and so on. In the exemplary embodiment according to FIG. 1, the movement is performed by means of a setting mechanism containing a spindle 11 driven by a crank handle 13 via the bevel gears 12. The mounting support 14 carrying the equipment 5 for generating the vacuum for the suction heads 9, which simultaneously constitutes a counterweight is constructed in such manner that the traverse carrying the suction heads 9 is connected to the mounting support 14 for pivoting. In this connection, the rotating plane is parallel to the suction plane of the suction device 1.

For the fine movement of the glass pane 10 held according to the example, a support 19 is attached to the crane arm 7, this support 19 being pivotably connected to the crane arm 7. The support 19 comprises the cable pulley 6 and the cable winch 15 with the electric motor 8 (FIG. 2). The side of the support 19 opposite the cable pulley 6 is provided with a gear rack 16 cooperating with a pinion 17 driven by an electric motor 18. In this way, the support 19 can be moved to the left and to the right. Likewise, the movement of the support 19 can be performed by other known kinds of driving systems.

It is also conceivable to provide a pick-up device at the free end of the crane arm 7, or the support 19, respectively, having a pick-up opening from underneath, while the mounting support 14 has a guide directed upwards. By means of the cable winch 15 and the cable rope 3 the mounting support 14 can be pulled into the non-illustrated pick-up device and be kept there.

The support 19 can optionally have such a telescopic design that it can be lengthened or shortened under load.

The rotary device 9 which is of the suction device is lockable in different positions comprises a fine adjustment device which renders additionally possible an exact horizontal balancing of the glass pane 10, especially when the glass pane 10 was not grasped exactly in its center when applying the suction device 9.

What is claimed is:

1. An arrangement for use with a crane arm for vertically positioning a plate-shaped body, comprising a suction device operative for holding the plate-shaped body by suction at a suction plane and a traverse for supporting said suction device, means for hoisting and lowering said suction device, comprising an elongated flexible element, a support for said flexible element, said flexible element having a free end portion; a cable pulley and a cable rope, and means for raising and lowering said cable rope; means for mounting said suction device on said end portion of said flexible element at a variable point of attachment, comprising a tilting device connected to said suction device and to said rope, means for driving said tilting device, said means for mounting the suction device being operative to displace said point of attachment toward and away from said suction plane, whereby the position of the center of gravity of the combination of said arrangement with said plate-shaped body varies until the point of attachment is above said center of gravity and said plate-shaped body extends vertically; and wherein said suction device has a side which faces away from said suction plane and comprising a counterweight attached to said side of said suction device.

2. The arrangement as to claim 1, wherein said counterweight is attached to said suction device for movement relative thereto.

3. The arrangement as defined in claim 1, wherein the crane arm has an end portion which is tiltable relative to the remainder of the crane arm along a substantially horizontal plane.

4. The arrangement as defined in claim 1, wherein the crane arm has an end portion which is extendable and shortenable.

5. The arrangement according to claim 1 wherein said means for driving said tilting device comprises a spindle, a crank handle for moving the spindle and a bevel gear between said crank handle and said spindle.

* * * * *